US009028328B2

(12) United States Patent
Bernard et al.

(10) Patent No.: US 9,028,328 B2
(45) **Date of Patent: *May 12, 2015**

(54) INTERACTIVE BROADCAST SPORTS GAMING

(71) Applicant: Fox Sports Interactive Media, LLC, Los Angeles, CA (US)

(72) Inventors: James Bernard, Thousand Oaks, CA (US); Matthew Calos, Marina Del Ray, CA (US); Keith Dobkowski, Manhattan Beach, CA (US); Kevin Goldner, Lebanon, OH (US); Edward Goren, Rolling Hills, CA (US); Ryan Kuttler, Playa Del Rey, CA (US); Patrick Miller, Cincinnati, OH (US); Adam Slotnick, Studio City, CA (US); Darrin Vaniglia, Mason, OH (US); Thomas Zentmeyer, Cincinnati, OH (US)

(73) Assignee: Fox Sports Interactive Media, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/089,925

(22) Filed: Nov. 26, 2013

(65) Prior Publication Data

US 2014/0162788 A1 Jun. 12, 2014

Related U.S. Application Data

(62) Division of application No. 13/093,841, filed on Apr. 25, 2011, now Pat. No. 8,622,835.

(60) Provisional application No. 61/327,671, filed on Apr. 24, 2010.

(51) Int. Cl.
*A63F 13/30* (2014.01)
*G07F 17/32* (2006.01)

(52) U.S. Cl.
CPC ............ *A63F 13/12* (2013.01); *G07F 17/3272* (2013.01)

(58) Field of Classification Search
USPC .......................................... 463/40–42, 17–25
See application file for complete search history.

(56) References Cited

U.S. PATENT DOCUMENTS

| | | | | |
|---|---|---|---|---|
| 6,193,610 | B1 * | 2/2001 | Junkin | 463/40 |
| 6,439,997 | B1 * | 8/2002 | Brasseur et al. | 463/40 |
| 2003/0022622 | A1 * | 1/2003 | Weinblatt et al. | 455/3.06 |
| 2003/0149616 | A1 * | 8/2003 | Travaille | 705/12 |
| 2006/0178193 | A1 * | 8/2006 | Hunter | 463/17 |
| 2007/0028272 | A1 * | 2/2007 | Lockton | 725/62 |
| 2007/0233585 | A1 * | 10/2007 | Ben Simon et al. | 705/35 |
| 2008/0133417 | A1 * | 6/2008 | Robinson | 705/52 |
| 2009/0089838 | A1 * | 4/2009 | Pino et al. | 725/40 |
| 2009/0156179 | A1 * | 6/2009 | Hahn et al. | 455/414.1 |
| 2009/0177533 | A1 * | 7/2009 | Inselberg | 705/10 |
| 2011/0154408 | A1 * | 6/2011 | Svensson et al. | 725/58 |

* cited by examiner

*Primary Examiner* — Masud Ahmed
(74) *Attorney, Agent, or Firm* — Cantor Colburn LLP

(57) ABSTRACT

A method of interactive gaming includes identifying a broadcast event, generating interactive questions for the broadcast event based upon a subject of the broadcast event, organizing the generated questions based on a structure of the broadcast event, and providing the organized questions to a user during a broadcast of the broadcast event through an interactive gaming interface based on the structure of the broadcast event.

32 Claims, 18 Drawing Sheets

INTERACTIVE BROADCAST SPORTS GAMING

CROSS REFERENCE TO RELATED APPLICATIONS

The present application is a divisional of U.S. patent application Ser. No. 13/093,841 filed Apr. 25, 2011, which claims priority to U.S. Patent Provisional Application No. 61/327,671 filed Apr. 24, 2010, all of which are hereby incorporated by reference in their entirety.

TECHNICAL FIELD

The present invention is generally related to interactive gaming and broadcast sports. More particularly, example embodiments of the present invention are directed interactive gaming during broadcast sporting events.

BACKGROUND OF THE INVENTION

Conventionally, interactive gaming involves access to an interactive interface such as, for example, a website. Users of the website interact with other users through a variety of provided tools. For example, instant messaging, commenting, text fields, live audio, live video, and other similar communication means may be integrated within a website to provide for inter-user communication regarding an interactive game.

SUMMARY

According to one embodiment of the present invention, a method of interactive gaming includes identifying a broadcast event, generating interactive questions for the broadcast event based upon a subject of the broadcast event, organizing the generated questions based on a structure of the broadcast event, and providing the organized questions to a user during a broadcast of the broadcast event through an interactive gaming interface based on the structure of the broadcast event.

According to an additional embodiment of the present invention, a system for interactive gaming includes a broadcast event server configured to provide a televised feed of broadcast events, and an interactive gaming web server in communication with the broadcast event server, wherein the interactive gaming server is configured to perform a method of interactive gaming. The method includes identifying a broadcast event, generating interactive questions for the broadcast event based upon a subject of the broadcast event, organizing the generated questions based on a structure of the broadcast event, and providing the organized questions to a user during a broadcast of the broadcast event through an interactive gaming interface based on the structure of the broadcast event.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. Furthermore, each drawing contained in this provisional application includes at least a brief description thereon and associated text labels further describing associated details. The figures.

DETAILED DESCRIPTION

Further to the brief description provided above and associated textual detail of each of the figures, the following description provides additional details of example embodiments of the present invention.

Embodiments are directed to interactive gaming and broadcast sports. More particularly, example embodiments of the present invention are directed interactive online gaming during broadcast sporting events. For example, an interactive online game may include any game including sports fantasy games. Example embodiments include methods and interfaces for interactive online gaming which provide an enriched user experience geared towards providing fulfilling gaming experiences including group gaming, fantasy role and sports gaming, and other similar experiences based upon a live broadcast event.

For example, an interactive game may be based upon a live sporting event or entertainment event. Prior to broadcast of the event, a series of questions and/or other prompts may be established based upon the event. These questions and prompts may be organized, stored, and served to a user or group of users before, during, and after the event, thereby providing an immersive viewing experience which enriches a user's perception of the event and may provide more satisfaction as compared to gaming and viewing as separate experiences.

Figure 1:
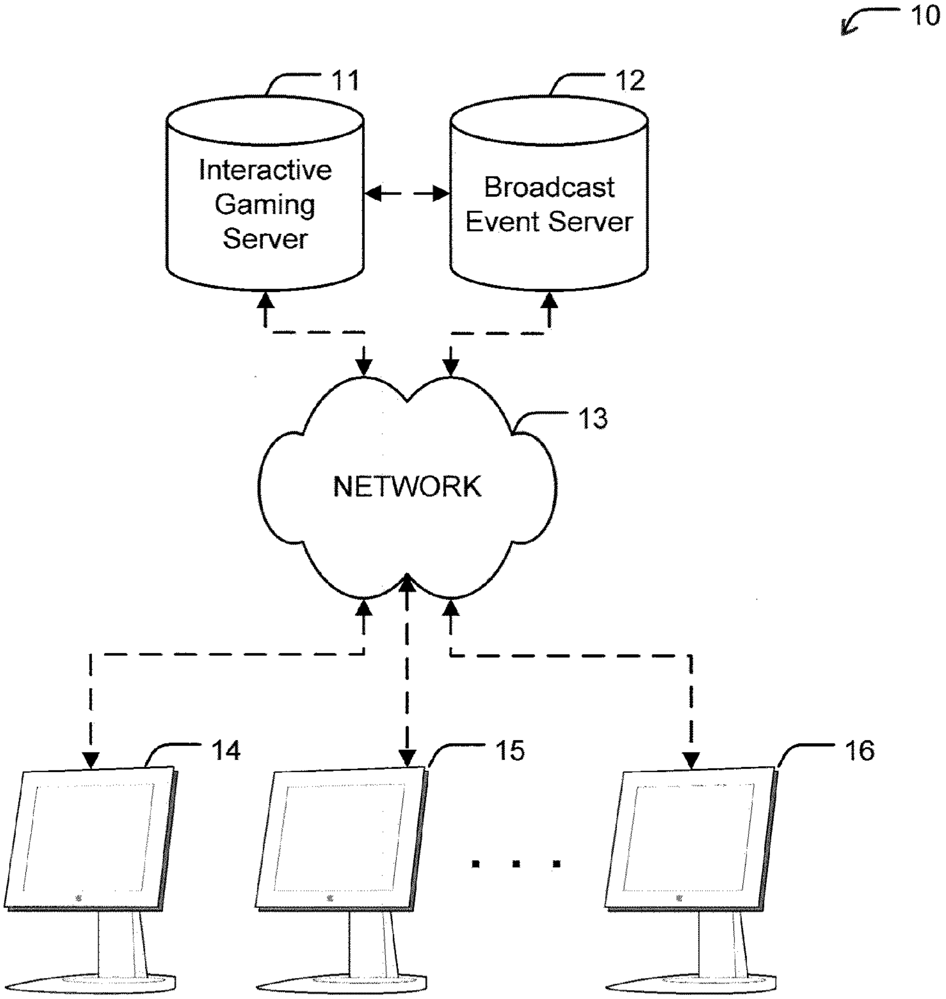
FIG. 1 illustrates an example interactive gaming system, according to an example embodiment of the present invention.

Turning now to the several figures, example embodiments are described in more detail. FIG. 1 illustrates an example interactive gaming system, according to an example embodiment of the present invention. The system 10 includes an interactive gaming server 11. The server 11 may be any server or computing apparatus configured to process program instructions disposed to serve a plurality of users with an interactive game based on the methods described herein. For example, an appropriate server may be a web server or server system configured to provide webpage information to user terminals (e.g., terminals 14-16) communicating over network 13. The network 13 may be a communication network such as the Internet or other suitable network. The network 133 may facilitate transmission of information between the terminals 14-16 and the server 11.

The system 10 further includes broadcast event server 12 in communication with the network 13 and the server 11. The broadcast event server 12 may be any suitable server or server system configured to provide broadcast event information. For example, the server 12 may provide online streaming of a live or broadcast event to terminals 14-16 and/or provide broadcast event information to server 11. However, it should be noted that the broadcast event server 12 may also be embodied as a television service provider system rather than a typical web server. Thus, the broadcast event server 12 may also broadcast an event over conventional channels to televisions or other similar devices, in addition to terminals 14-16.

According to example embodiments, broadcast events provided by the server 12 may be interpreted to establish an interactive game for a plurality of users at terminals 14-16. The interactive game may be tailored to a typical or target audience. For example, a sports-based game may be established based on a particular sporting event. Further, a movie-trivia game may be established based on a particular movie being broadcast or an awards ceremony being broadcast. As broadcast event information is readily available at server 11, new questions or portions of the interactive game may be established on-the-fly, during broadcast of the event, thereby providing a more immersive experience. The actual game may be accessed by a plurality of users as described below.

Figure 2:
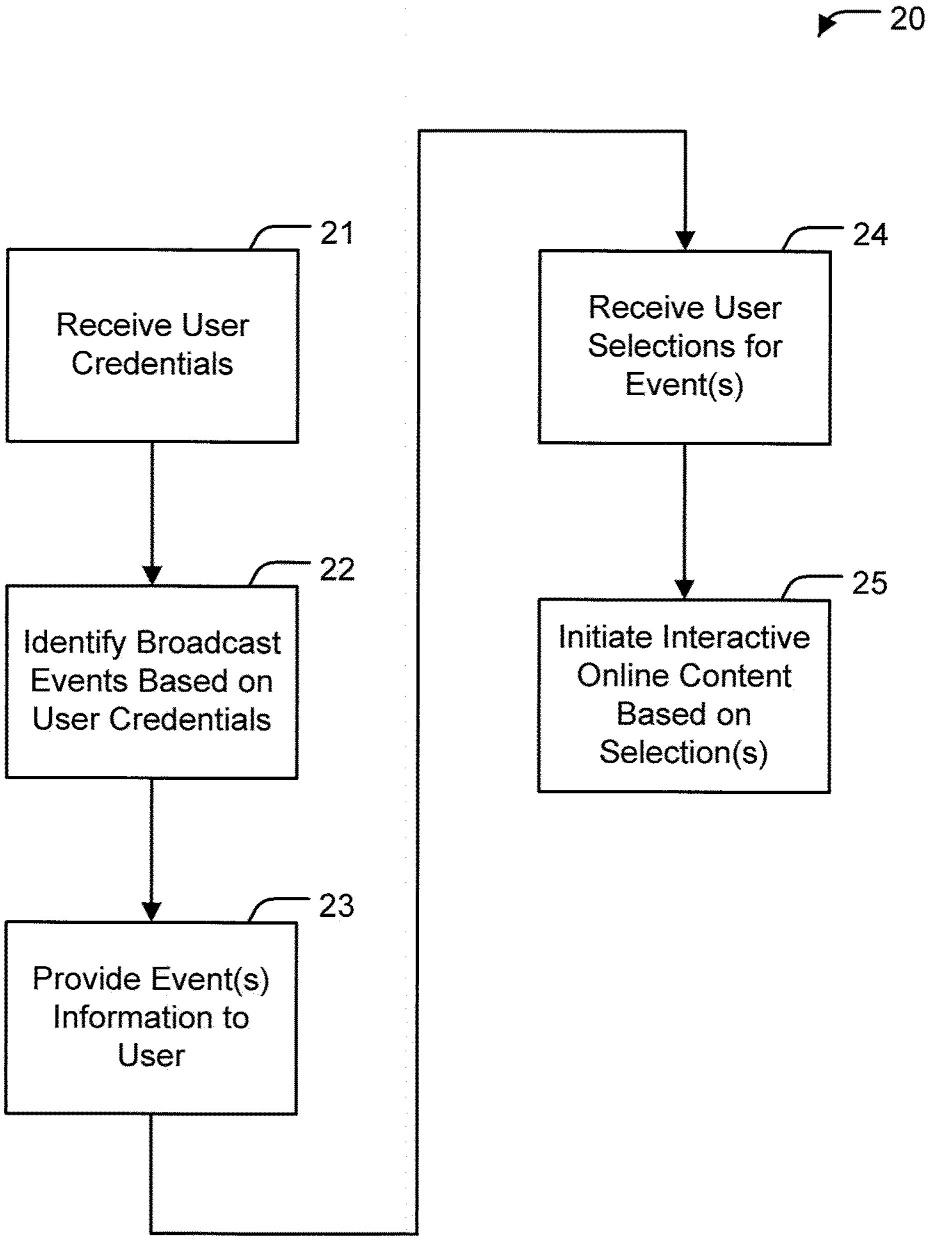
FIG. 2 illustrates an example interactive gaming method, according to an example embodiment of the present invention.

FIG. 2 illustrates an example interactive gaming method, according to an example embodiment of the present invention. The method 200 includes receiving a set of user credentials at block 21. The set of user credentials may include credentials identifying a user, a user account, type of user, location of a user, or any suitable combination of the same. For example, the set of credentials may include a username and password used to verify a user account. The set of credentials may further include information associated with the username and password. Thus, block 21 includes receiving user information associated with a user including any user information stored or associated with a user's account.

The method 20 further includes identifying broadcast events based on the user credentials at block 22. For example, identifying the broadcast events may include querying a database of past, present, and future events to determine if any events are applicable to the user based on the credentials. An applicable event may include a local event, an event matching a user's preferences, an event a particular user has registered to view, or any other suitable events.

Upon identifying the applicable events, the method 20 includes providing event information to the user at block 23. Providing the event information may include rendering, at a user terminal, a webpage or other interface graphically or textually identifying events with available interactive games. Upon providing, the method 20 includes receiving user selections for the events at block 24. For example, a user may select one or more available events at the rendered webpage or interface. Subsequently, the method 20 includes initiating interactive online content based on the selections at block 25.

Therefore, example embodiments of the present invention include identifying a user through a set of user credentials, identifying applicable and available broadcast events based on the credentials, providing the events' information to a user, and initiating interactive online content based on a user's selections of the provided events. Initiating interactive online content may include initiating and/or serving an interactive online game to a user. The interactive online game may be based upon the actual event and may be determined before and during the actual event, for example, as illustrated in FIG. 3.

Figure 3:
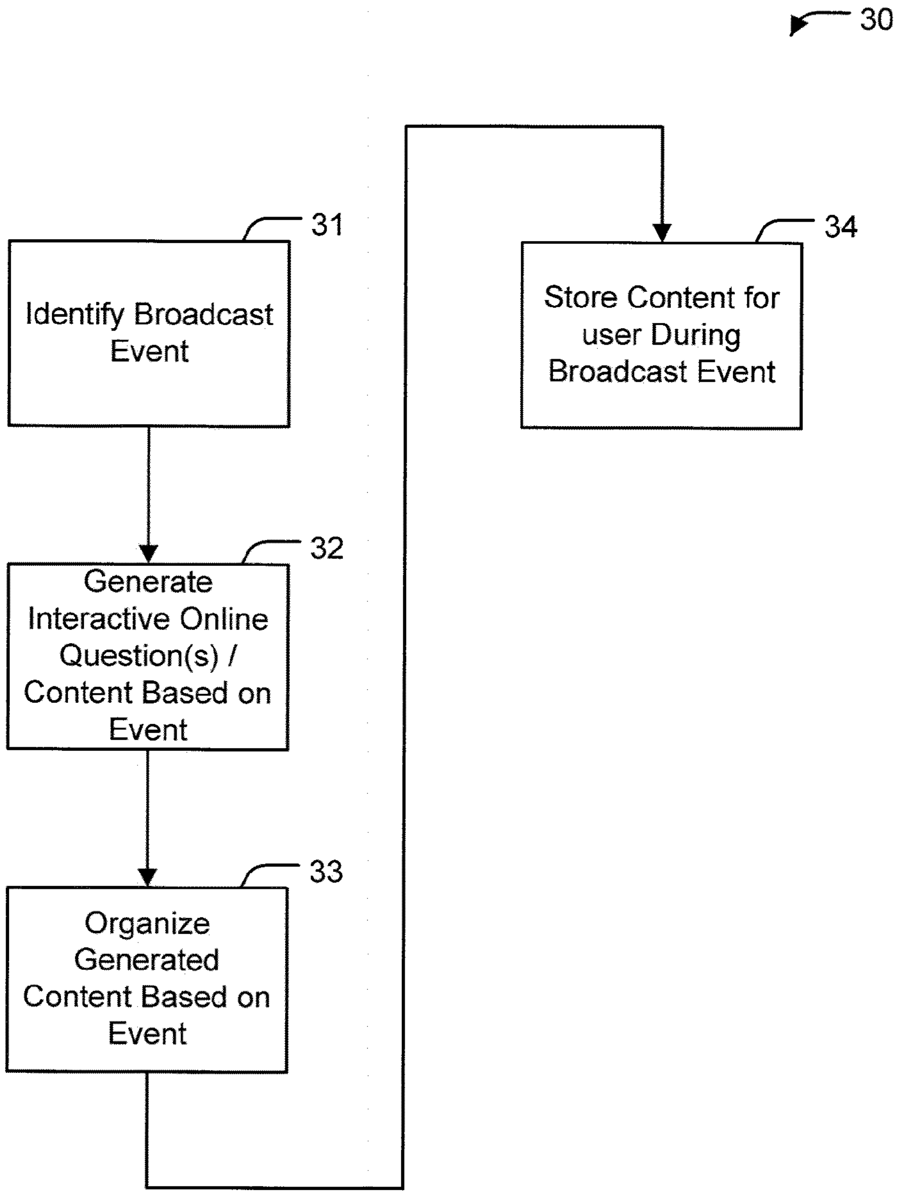
FIG. 3 illustrates an example interactive gaming method, according to an example embodiment of the present invention.

FIG. 3 illustrates an example interactive gaming method, according to an example embodiment of the present invention. The method 30 includes identifying a broadcast event at block 31. The broadcast event may be identified as an event which may draw a desire for interactive online gaming. Alternatively, the event may be identified by a user as a selection in method 20. In response to the identifying, the method 30 includes generating interactive online questions and/or content based upon the event at block 32. For example, sports-related or player-related questions may be chosen/generated based on a type of sporting event and/or teams associated with the event. The content may be organized based on the event at block 33, and may be stored for presentation to a user during the broadcast event at block 34.

The content may be organized based upon the type of event, based on a duration of the event, or based on other suitable attributes. For example, content may be organized into segments relating to known portions of an event, such as innings in a baseball game or categories in an awards ceremony. Therefore, during broadcast of those portions of the event or immediately prior to broadcasting of those portions, the content may be provided to users engaging in the online game. The questions and content may vary for each broadcast event and may have a different value (e.g., the more difficult the question, the higher point value). Further, new content may be continuously generated and/or chosen based upon the situations occurring in the broadcast event. The new content may also be presented to users based upon the event, in synch with the event, or in response to different portions of the event being currently broadcast. Therefore, example embodiments provide on-the-fly content to users which may be updated periodically or continuously during a broadcast event, thereby improving a user's experience. The content may be provided as a series of questions or prompts related to the event, for example, as illustrated in FIG. 4.

Figure 4:
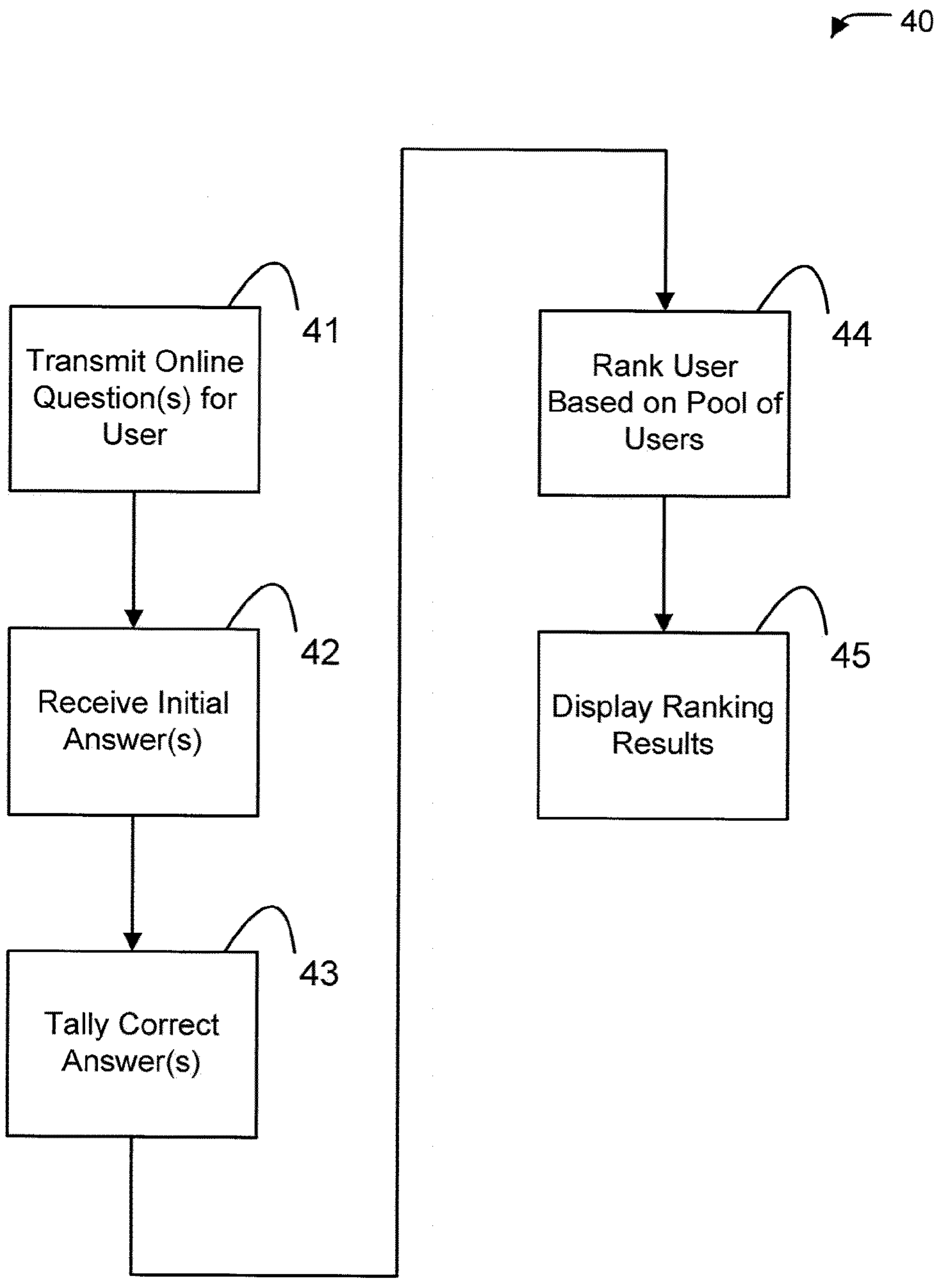
FIG. 4 illustrates an example interactive gaming method, according to an example embodiment of the present invention.

FIG. 4 illustrates an example interactive gaming method, according to an example embodiment of the present invention. The method 40 includes transmitting an online question related to a broadcast event to a user at block 41. The online question may be provided through a webpage or web interface served by an interactive online server as described above. The online question may be provided before or during a portion or segment of an associated broadcast event. For example, a question or series of questions related to a current baseball player may be provided immediately before or during the current baseball player's position at bat. The question may be related to a history of the player, or related to an expected outcome of the player's performance (e.g., if the player strikes a homerun).

The method 40 further includes receiving initial user answers to the question(s) provided at block 42. Correct answers may be tallied at block 43 and a user's rank may be established based on a pool of users at block 44. The pool of users may include a portion of users engaging in the interactive online game. The pool of users may be related to the user as friends or users with similar interests. Thereafter, the ranking results may be displayed for the user at block 45. Thus, a user interacting with the online questions during an associated broadcast event may view gaming results compared to other users on-the-fly based on questions answered by the user. The user may continue to interact for the duration of the broadcast event.

It should be appreciated that as users may interact during a broadcast event, and that as questions or prompts may be provided based upon actual circumstances in the event (e.g., overtime, player statistics, etc.), additional interaction from users may be promoted through provision of questions within the actual broadcast event. Thus, in combination with questions being provided through a website or interface, a spokesperson or game representative may actually be broadcast live (or pre-recorded) in the actual event feed prompting users for answers. A user may input answers through the interactive online gaming website for tallying score and rankings as described above.

Figure 5:
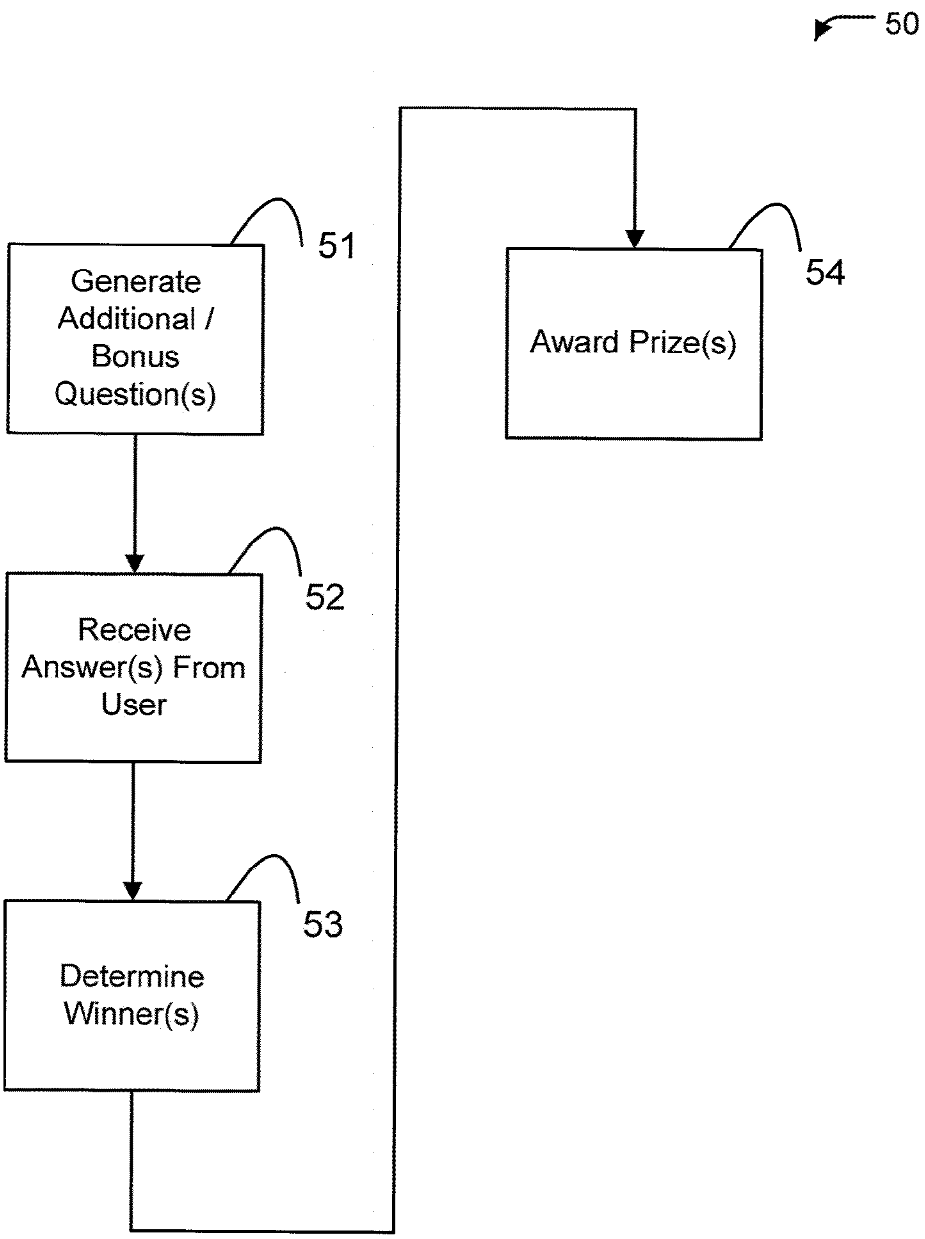
FIG. 5 illustrates an example interactive gaming method, according to an example embodiment of the present invention.

In addition to a simple sequence of interactive questions, bonus or special questions may also be provided, for example, as illustrated in FIG. 5. FIG. 5 illustrates an example interactive gaming method, according to an example embodiment of the present invention. As illustrated, the method 50 includes generating a bonus question at block 51. The generated bonus question(s) may be provided through the broadcast event and/or through the interactive online gaming system. The method 50 further includes receiving user answers at block 52 to determine and award winners at blocks 53-54. It should be understood that prizes may also be awarded during normal game-play as described above in addition to bonus question rounds or segments described in FIG. 5. Furthermore, a live announcer or on-air talent may announce the winner's name (e.g., during a sign-off period for the event, further enhancing a user's experience.

As described above, example embodiments of the present invention provide interactive online gaming based on broadcast events which promote a rich user experience as compared to gaming and event viewing alone. The interactive online gaming is facilitated through user interfaces provided from an interactive online gaming server of an interactive online gaming system.

Figure 6:
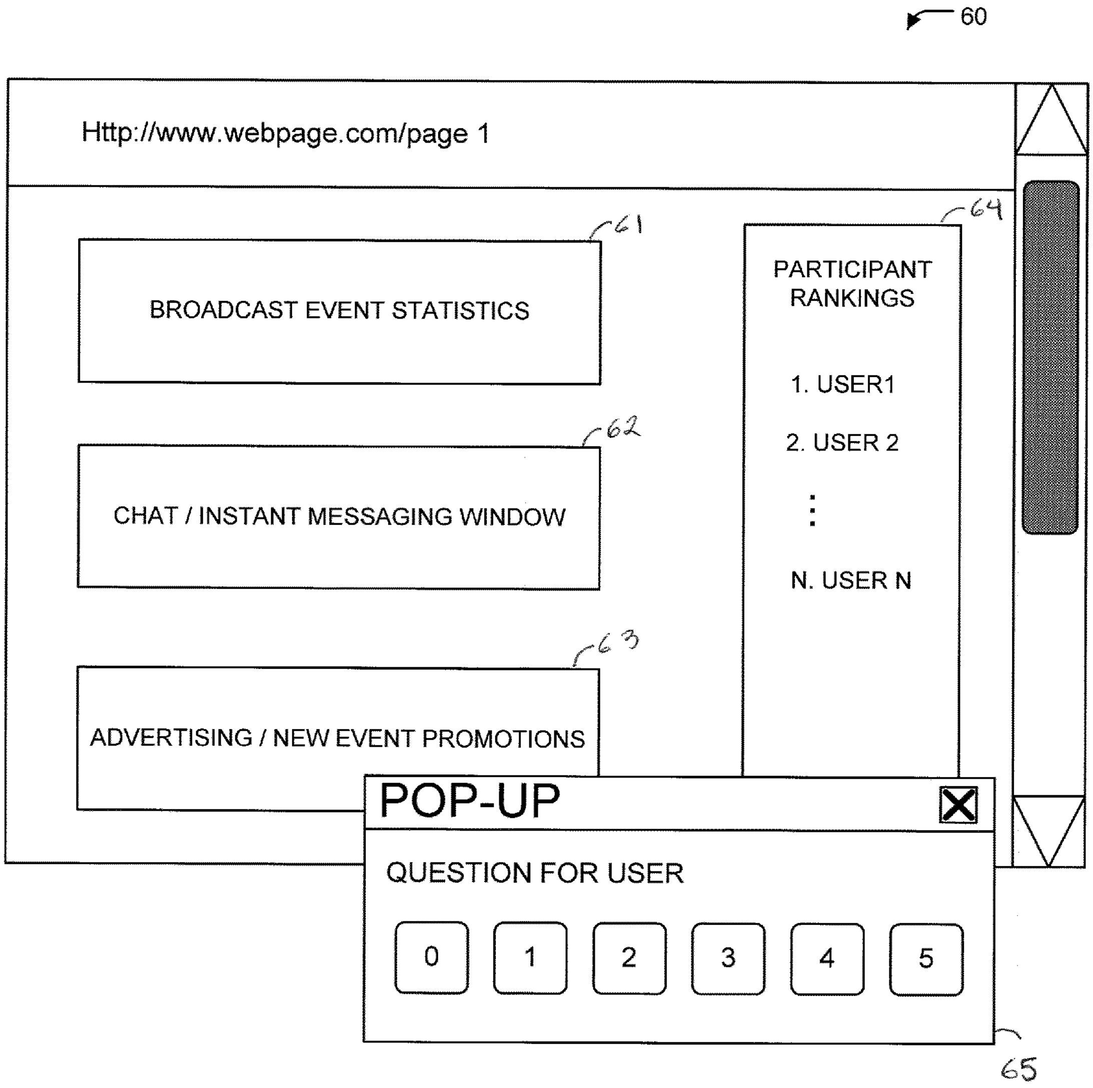
FIG. 6 illustrates an example interactive gaming interface, according to an example embodiment of the present invention.

FIG. 6 illustrates an example interactive gaming interface, according to an example embodiment of the present invention. As illustrated, the interface 60 includes a plurality of interface portions representing a broadcast event and users engaging with the interactive online gaming system. Broadcast event statistics including gaming statistics, occurrences in the broadcast event, user information, and or other information may be displayed through at least one broadcast event statistics graphical portion 61. Further, interactive communications including inter-user communications, messaging, blog or questions posts, and other suitable information may be displayed through at least one messaging graphical portion 62. Moreover, participant ranking and gaming results may be displayed through at least one results graphical portion 64. Even further, additional or current questions may be provided through at least one interaction graphical portion 65.

Additionally, advertising and/or promotions may be provided through at least one advertising graphical portion 63. Therefore, example embodiments provide a variety of manners in which to incorporate sponsorships, and traditional & interactive banner advertisements.

It should be understood that although illustrated in a particular format and orientation, the graphical portions described above should not be so limited. For example, more or less graphical portions may be arranged according to any applicable interactive game.

Hereinafter, a more detailed arrangement of the graphical portions described above is provided with reference to FIGS. 7-17, in which a plurality of renderings of a gaming interface 100, are illustrated.

Figure 7:
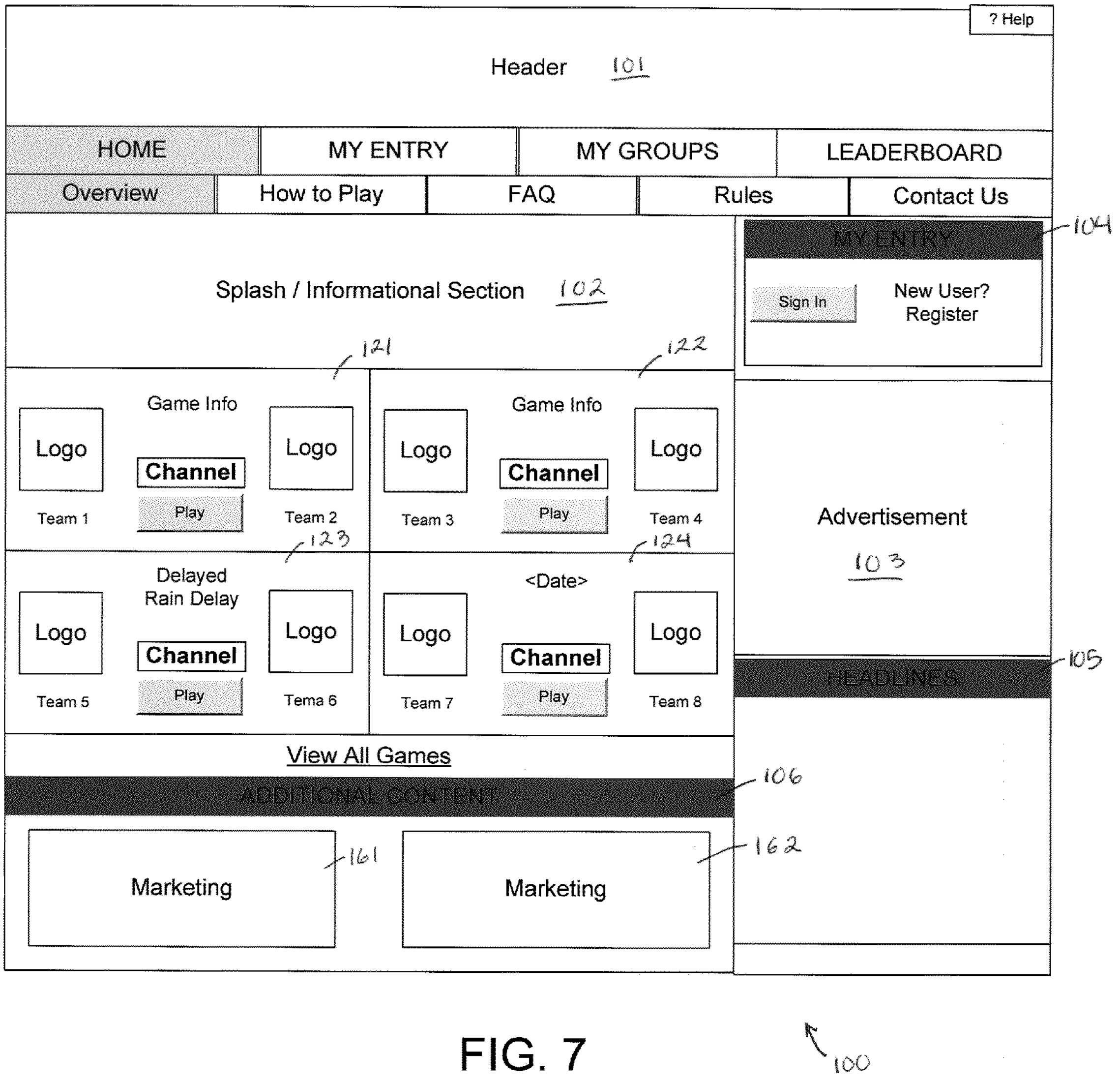
FIG. 7 illustrates an example interactive gaming interface, according to an example embodiment of the present invention.

Turning to FIG. 7, the interface 100 includes header 101 displaying information related to the interactive online content. The header 101 may include a plurality of navigation portions and tabs configured to allow user access to different graphical portions of the interface 100. The interface 100 may allow an online offering that coincides with available events broadcast nationally and regionally. This may include regular programming, special events, sports games, and associated playoff games. Using the interface 100, users may participate in as many games as they choose. As described above, live scoring may be used throughout the game so the participant can track progress online during the broadcast event.

The interface 100 further includes informational section 102 displaying information related to a current interactive online game or available games through portions 121, 122, 123, and 124. For example, the next four unfinished and non-postponed broadcast events on the sporting schedule are shown in portions 121, 122, 123, and 124. Games may be listed from left to right, top to bottom according to scheduled start date then scheduled start time.

Each available event displayed in portions 121, 122, 123, and 124 includes event and game information. Furthermore, game and/or event status may be displayed (e.g., delayed, date/time, etc.).

Figure 13:
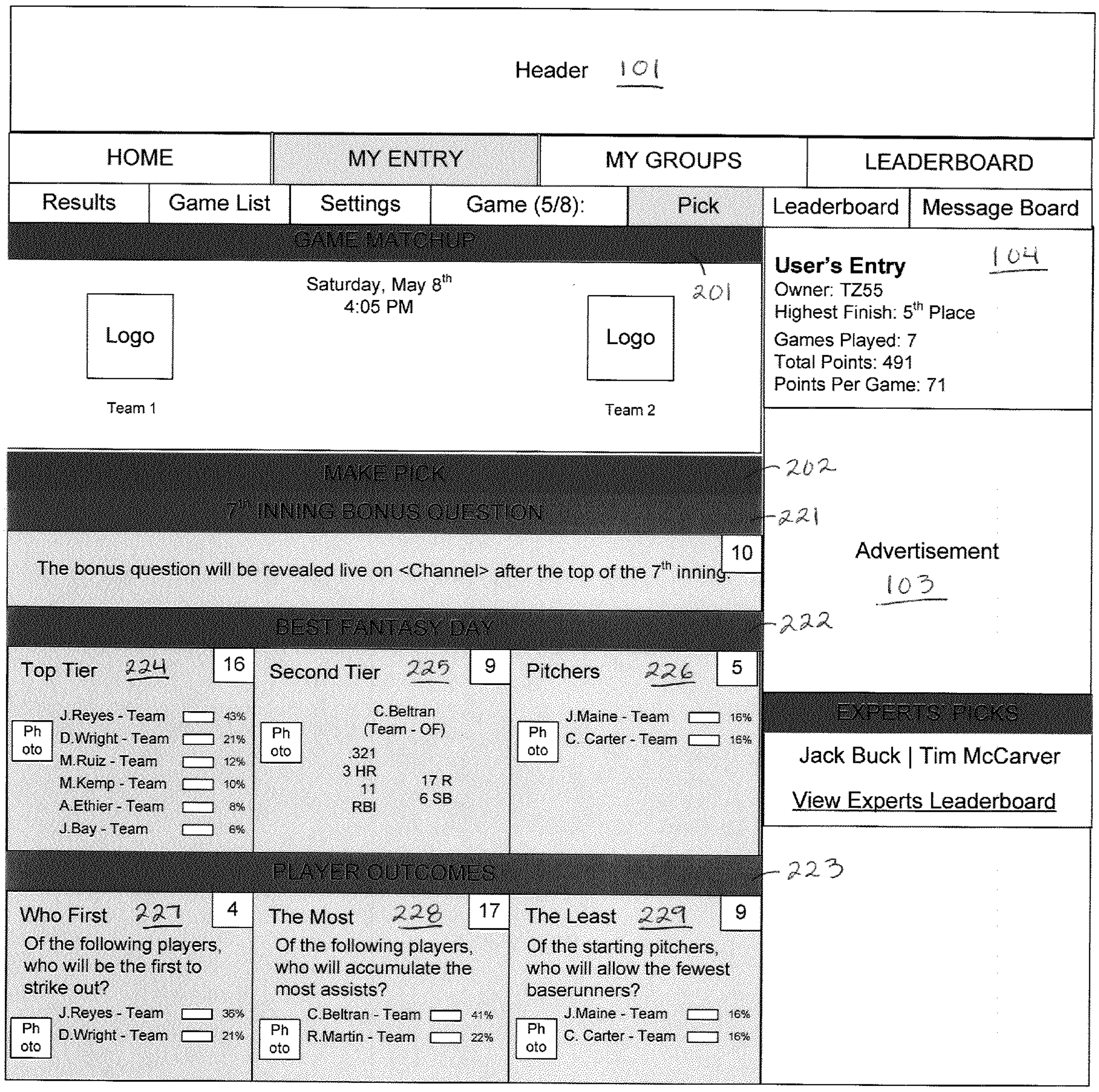
FIG. 13 illustrates an example interactive gaming interface, according to an example embodiment of the present invention.

A "Play" button may always present in portions 121, 122, 123, and 124 such that a user can make picks for the associated game, review picks during the game, or review picks after the game. Clicking the "Play" button will take the user to the individual game's "Game Pick" page (FIG. 13). If not registered or logged in, it will take them to the proper spot then redirect to the "Game Pick" page. If the user does not yet have an entry, it will take them to the "Create Entry" page (FIG. 9) before redirecting to the "Game Pick" page.

The portions 121-124 may also include broadcast event information including a television channel or web address at which to view the broadcast event, and may provide selection portions to allow a user to select a particular game to play.

The interface 100 further includes a user information portion 104 which may allow a user to enter credentials and view associated login information. For example, upon logging in, portion 104 may display an entry name, the owner of the entry's screen name, highest finish in an individual game during the season, the number of games played, total points for the season, and/or average points per game for the season.

The interface further includes advertisement portion 103 for displaying advertisements, and headlines portion 105 for displaying current headlines related to broadcast events (e.g., related news, upcoming events, etc.). Furthermore, additional content including marketing or promotion may be provided through additional content portion 106 and associated portions 161-162.

Figure 8:
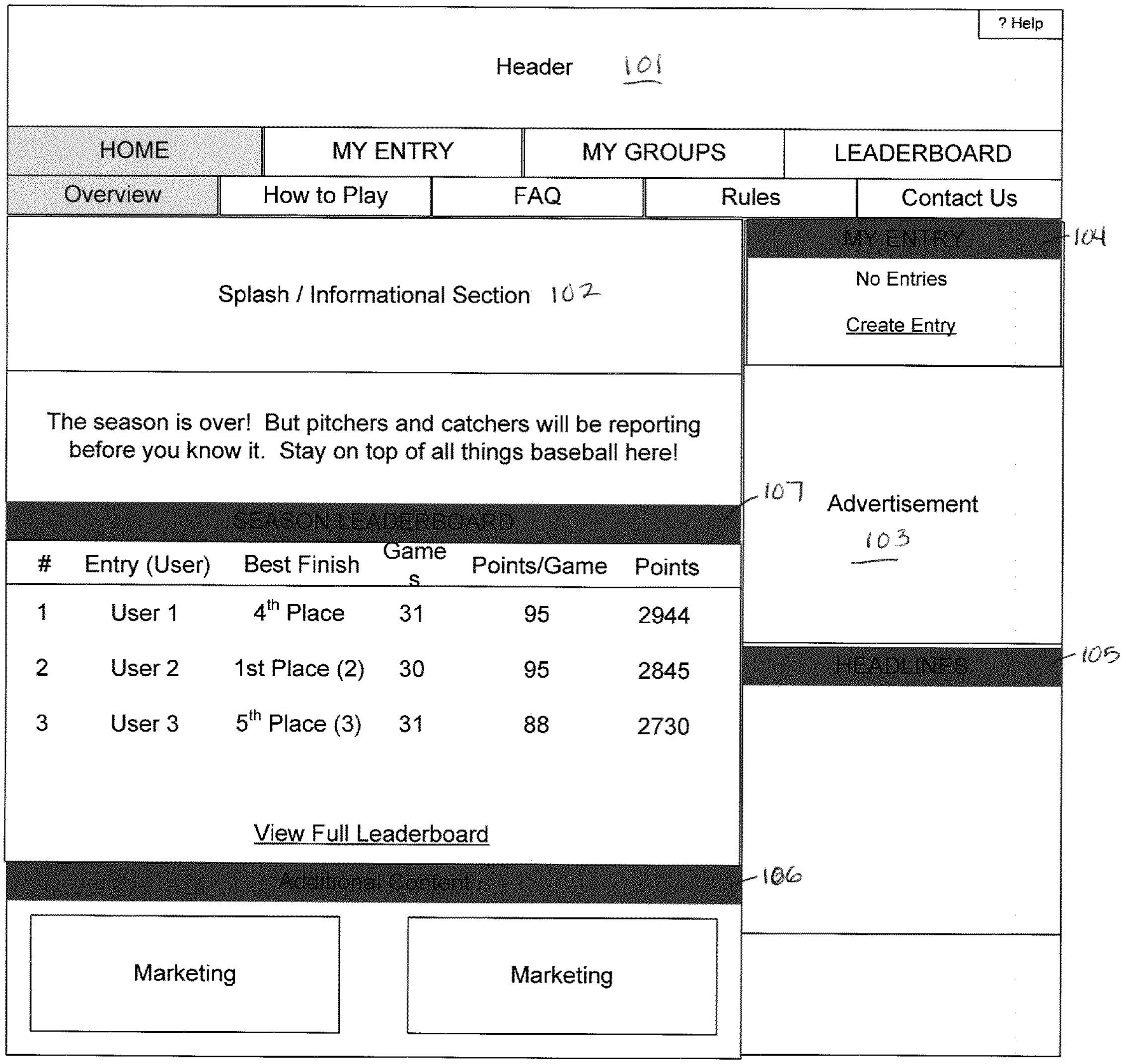
FIG. 8 illustrates an example interactive gaming interface, according to an example embodiment of the present invention.

Turning now to FIG. 8, a "LEADERBOARD" view of the interface 100 is illustrated. The leaderboard section 107 includes an ordered list based on points for users associated with the interactive game. For example, the ordered list includes rank, entry name, user's screen name, best finish in an individual game during the season (if more than one of same, show count in parenthesis), number of games played, average points per game and total points. Furthermore, an entire row may also be a dynamic web-link to the entry home page (FIG. 10) for user for viewing of individual statistics/information.

Figure 9:
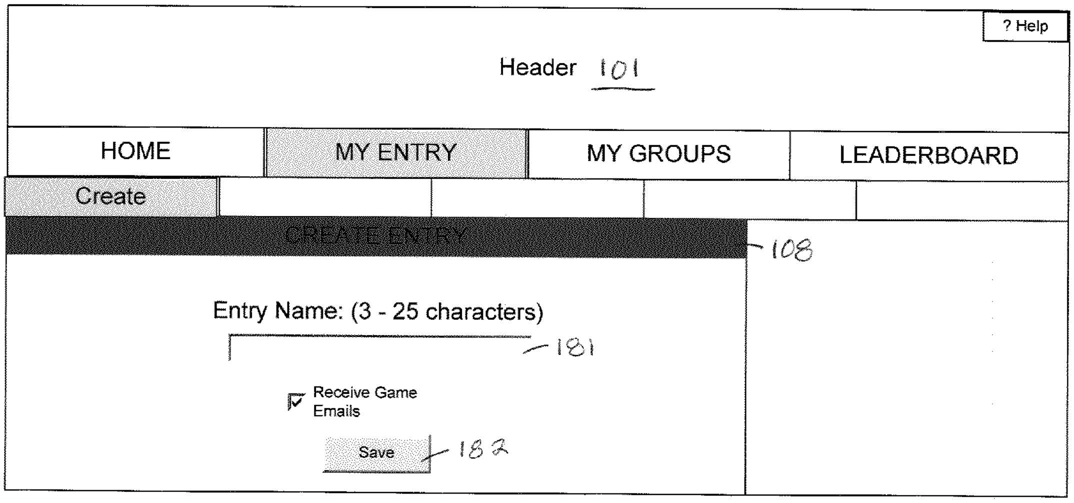
FIG. 9 illustrates an example interactive gaming interface, according to an example embodiment of the present invention.

Turning to FIG. 9, a "CREATE ENTRY" view of interface 100 is illustrated. As shown, a new entry portion 108 is rendered which provides interface portions 181 and 182 for the creation of new entries for a particular broadcast event.

Figure 10:
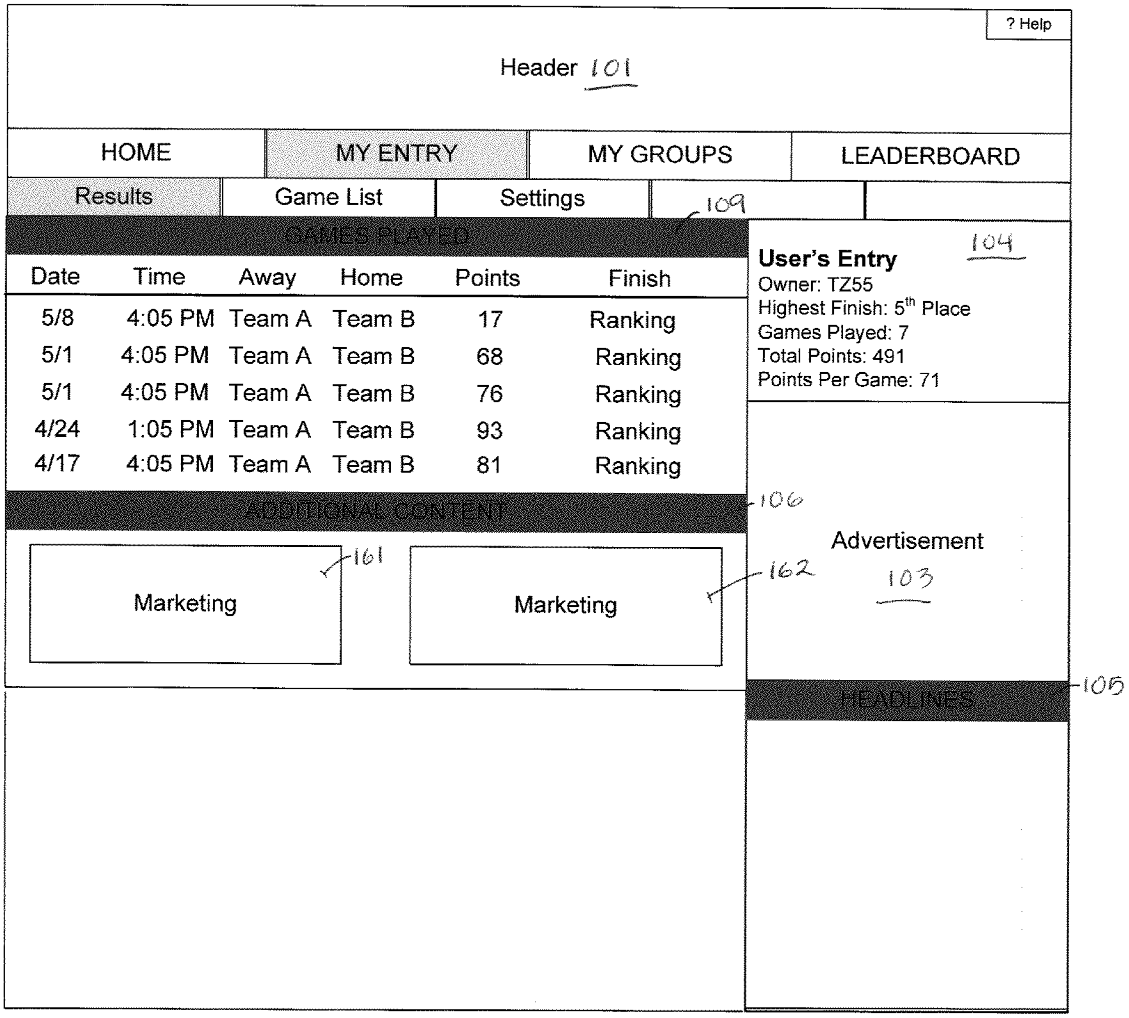
FIG. 10 illustrates an example interactive gaming interface, according to an example embodiment of the present invention.

Turning to FIG. 10, an "ENTRY HOME PAGE" view of interface 100 is illustrated. As shown, user statistics portion 109 is rendered which displays information related to recent games a user has played, including associated game information, points per game, and rankings.

Figure 11:
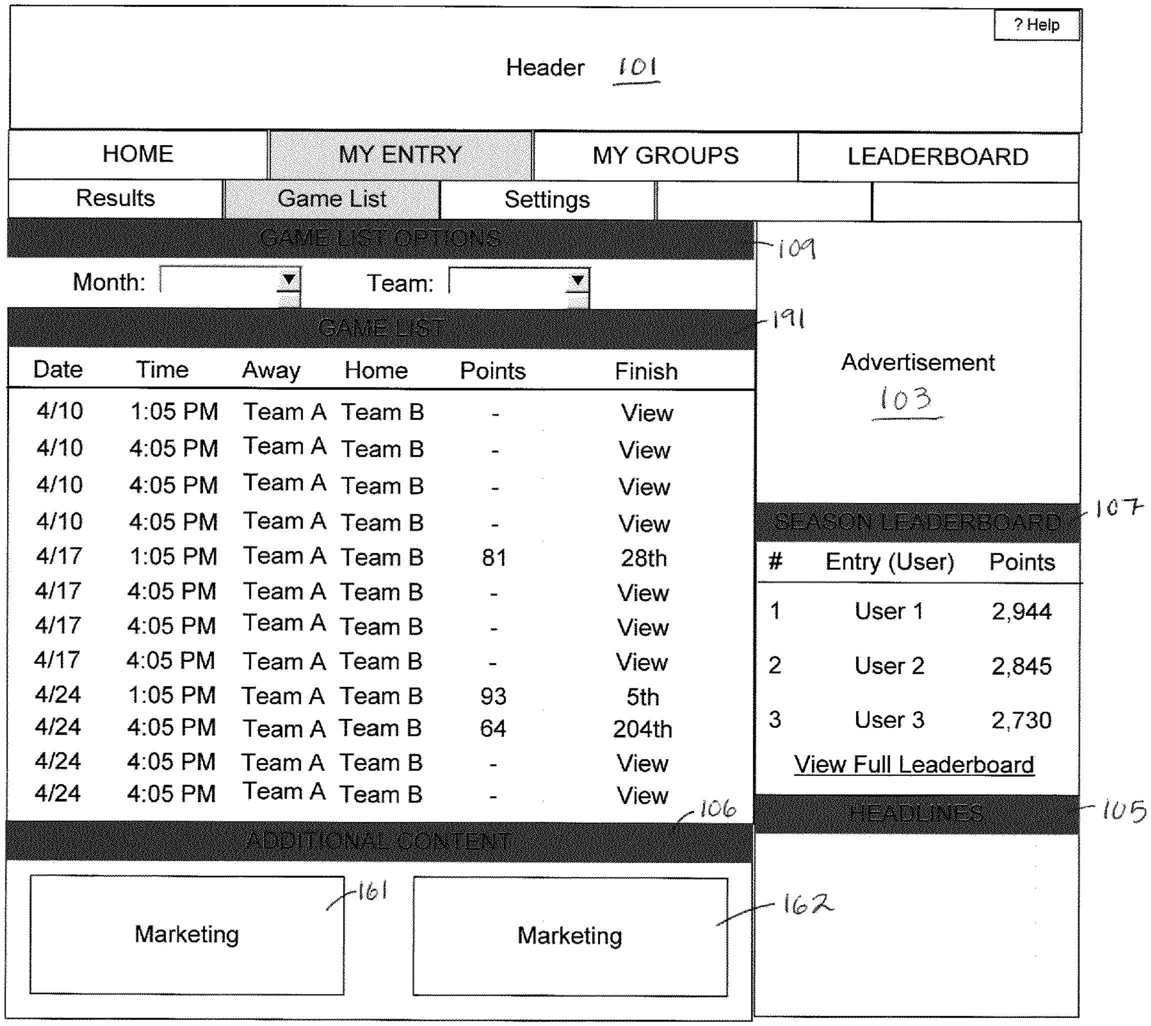
FIG. 11 illustrates an example interactive gaming interface, according to an example embodiment of the present invention.

Turning to FIG. 11, an "ENTRY GAME LIST" view of interface 100 is illustrated. As shown, a game list portion 109 is provided for viewing of available, current, or previously player games through listing 191.

Figure 12:
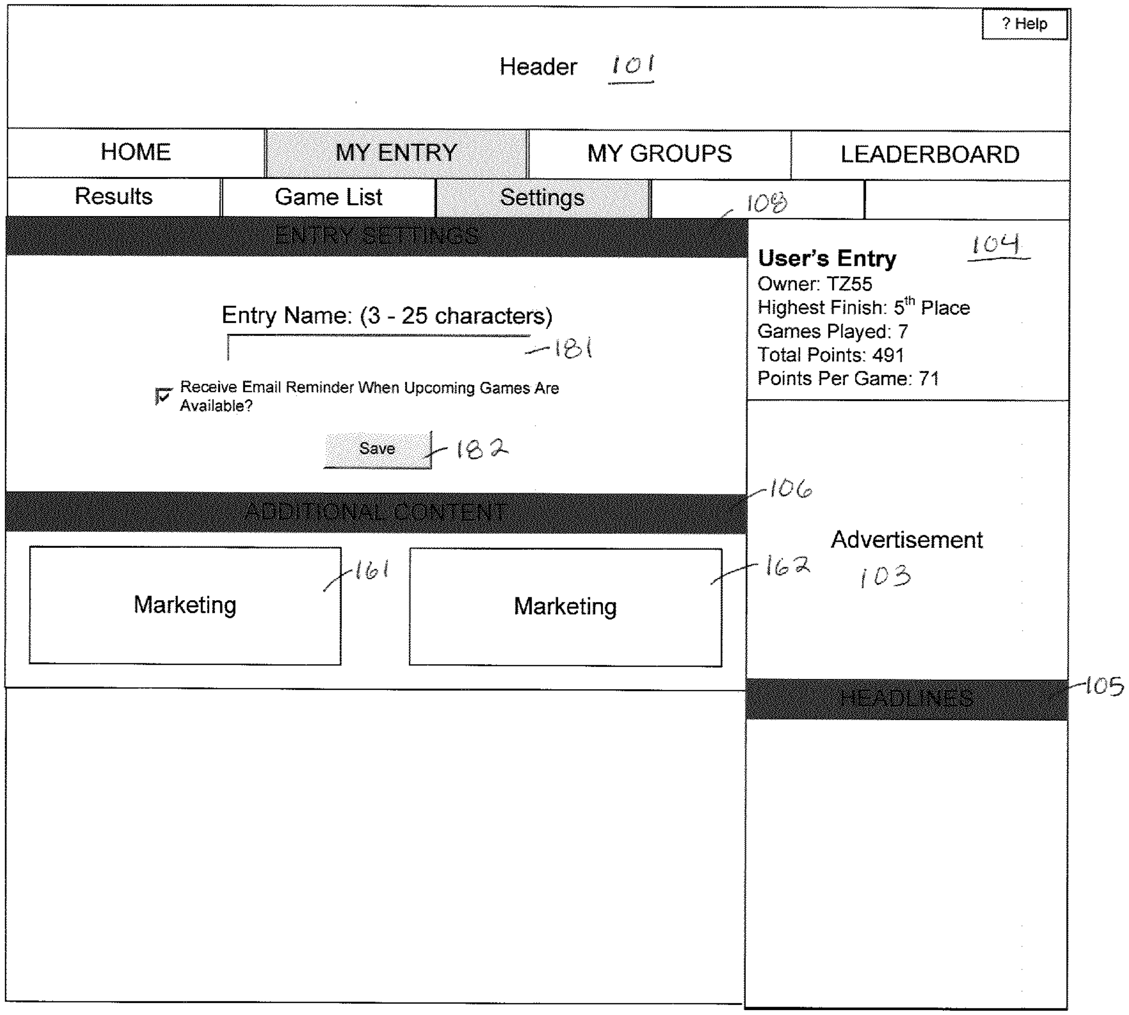
FIG. 12 illustrates an example interactive gaming interface, according to an example embodiment of the present invention.

Turning to FIG. 12, an "ENTRY SETTINGS" view of interface 100 is illustrated. As shown, entry portion 108 is rendered which provides interface portions 181 and 182 for the adjustment of entries for a particular broadcast event.

Turning to FIG. 13, a "GAME MATCHUP" view of interface 100 is illustrated. As shown, game matchup portion 201 is rendered which provides portion 202 for answering of interactive questions through portions 221 and 223. For example, portion 221 may be a bonus question portion for entry of an answer to a bonus question near the end of an interactive game (e.g., 7th inning) Portion 223 may provide individual interactive questions 227-229 for user interaction. Portion 222 may provide statistics 224-226 related to different attributes of an interactive game (e.g., player statistics, types of players, etc.). Additionally, an "Expert's Picks" portion 230 may be provided which outlines options selected by known people associated with a broadcast event (e.g., famous players, coaches, etc.).

According to FIG. 13, interactive questions may be divided into groups. Each question group is worth a predetermined number of points. The questions and potential answers may be dynamically driven by feeds and preset question types with token swaps. The questions can be answered during the duration of a game or during a particular window for answering. Each question may have a different point value, for example, to reduce the possibility of a tie. The point value for each question may be displayed with the question. Furthermore, as a game progresses and broadcast event completes, a background color around a question will turn green for an official correct answer, yellow for a temporary correct (e.g., after midway through a broadcast event), or red for an official incorrect answer. The number representing point value will be clearly marked.

Answers are initially listed by order of descending fantasy value or alphabetical depending on the question type. When live scoring kicks in, they are ordered by accuracy with the most correct answer at the top. Ties result in all top answers receiving points.

Each question may include a potential answer listed along with a popularity mete (e.g., see 224-226).

An example question group for portions 222-229 may include the following questions directed towards a broadcast baseball game event:

A. Best Fantasy Day
- a. Which of the following players will have the best fantasy day?
  - i. Top 6 available position players on two rosters (based on fantasy $ value)
  - ii. Next 6 available position players on two rosters (based on fantasy $ value)
  - iii. Each team's starting pitchers.

B. Player-specific Props
- a. Of the following players, who will be the FIRST to ACTION in the game? Choose from list of 8 players. Also include "None".
  - i. Homer
  - ii. Score a Run
  - iii. Drive in a Run
  - iv. Double
  - v. Triple
  - vi. Strike out
  - vii. Walk
  - viii. Steal a base
  - ix. Ground into a Double Play
  - x. Hit a Sac Fly
  - xi. Sac Bunt
  - xii. Make an Error
- b. Of the following players, who will accumulate the most ACTION in the game? Choose from list of 8 players.
  - i. Home Runs
  - ii. Singles
  - iii. Doubles
  - iv. Triples
  - v. Walks
  - vi. Runs
  - vii. RBI
  - viii. 2-out RBI
  - ix. Pitches Seen
  - x. Assists
  - xi. Putouts
  - xii. Stolen Bases
  - xiii. Runners Left on Base
- c. Of the two starting pitchers, who will accumulate the most ACTON in the game?
  - i. Strike outs
  - ii. Pitches Thrown
  - iii. Innings Pitched
- d. Of the two starting pitchers, who will accumulate the fewest ACTON in the game?
  - i. Walks Allowed
  - ii. Hits Allowed
  - iii. Home Runs Allowed
  - iv. Baserunners Allowed
  - v. Earned Runs Allowed
- e. How many ACTION will PLAYER accumulate during the game?

i. Actions
1. Hits
2. RBI
3. SB
4. Runs
ii. Count
1. 0
2. 1
3. 2
4. 3
5. 4+
f. Of the following TEAM players, who will be the first to enter as a pinch-hitter? Include “none”.
C. Team-specific Props
a. What inning will the TEAM score the most runs?
i. 3-8
b. Which team will accumulate the most ACTION?
i. Hits
ii. Runs
iii. Home Runs
iv. Strike Outs
v. Stolen Bases
vi. Walks
vii. Baserunners
c. Which team will go with a reliever first? Include “neither”.
d. Which team will have its manager ejected first? Include “neither”.
e. Which team will have a player ejected first? Include “neither”.
f. Which team will be the first to use a pinch-hitter? Include “neither”.
g. Which team will strand the most runners in the Xth inning'?
h. Which team will strand the most runners in scoring position?
i. Which team will get the most 2-out hits?
j. Which team will turn more double-plays?
k. How many ACTIONS will the two teams combine for in the game?
i. Runs
1. 0-4
2. 5-8
3. 9-12
4. 13-16
5. 17+
ii. Y Hits
1. 0-8
2. 9-16
3. 17-24
4. 25+
iii. Y Strikeouts
1. 0-8
2. 9-16
3. 17-24
4. 25+
iv. Y Home Runs
1. 0-2
2. 3-4
3. 5-6
4. 7-8
5. 9+
D. Bonus Questions
a. Odd, tough to research statistical fact from Game Notes
b. $7^{th}$ or $8^{th}$ inning specific question in similar vein to those above
i. Of the following players, who will be the first to college a ACTION in the $8^{th}$ inning'?
ii. Which team will collect the most ACTION in the $8^{th}$ inning'?

Figure 14:
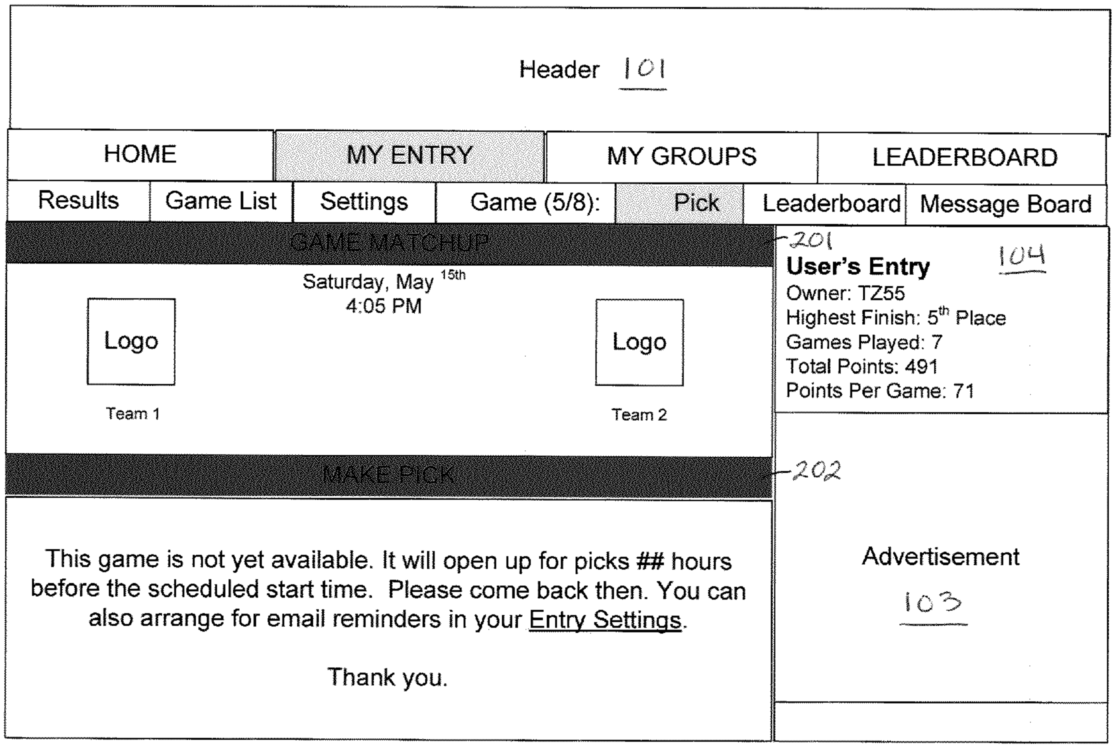
FIG. 14 illustrates an example interactive gaming interface, according to an example embodiment of the present invention.

Turning to FIG. 14, a “GAME MATCHUP” view of the interface 100 is illustrated when a broadcast event is not available. As shown, instructions related to when a game becomes available are provided for user reference.

Figure 15:
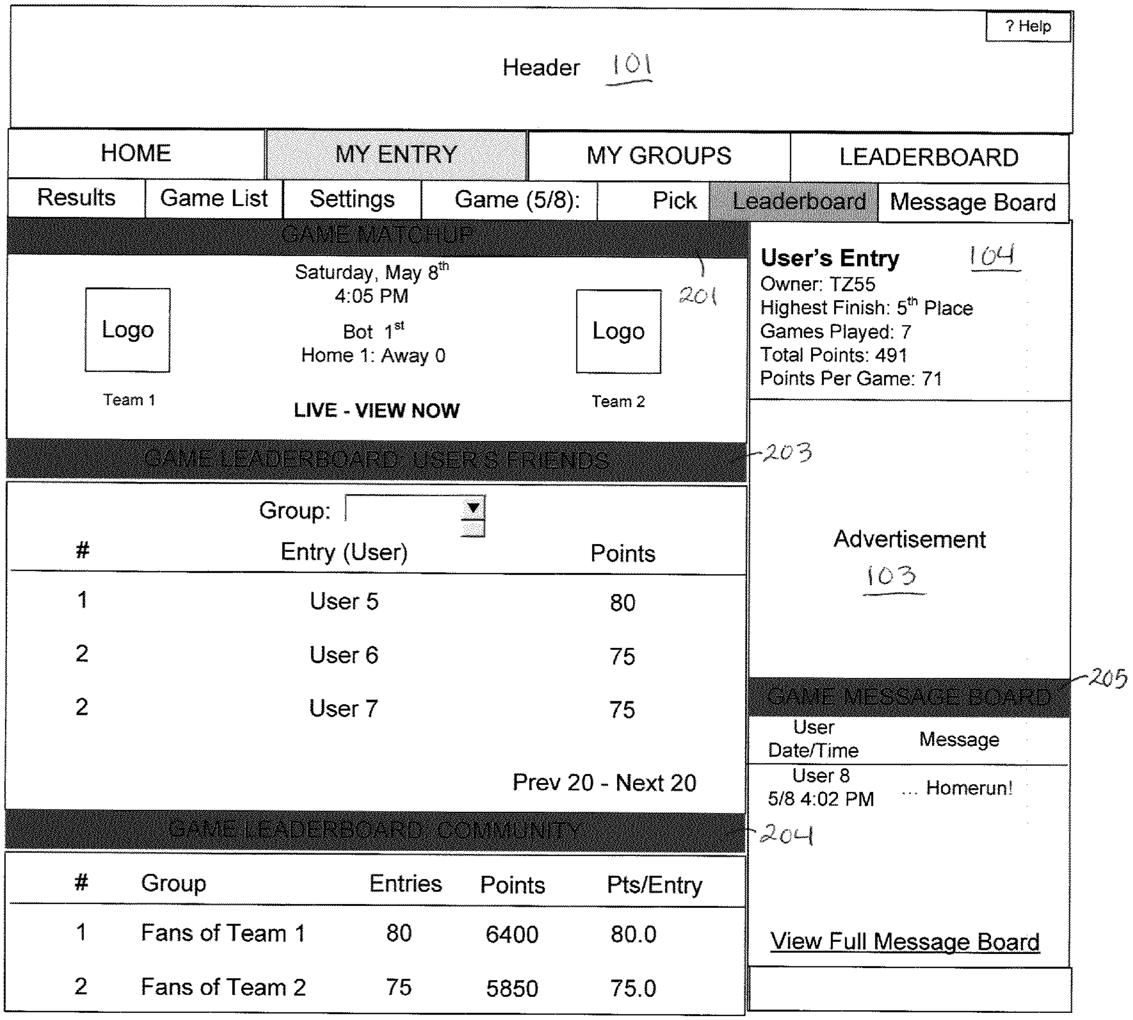
FIG. 15 illustrates an example interactive gaming interface, according to an example embodiment of the present invention.
Figure 16:
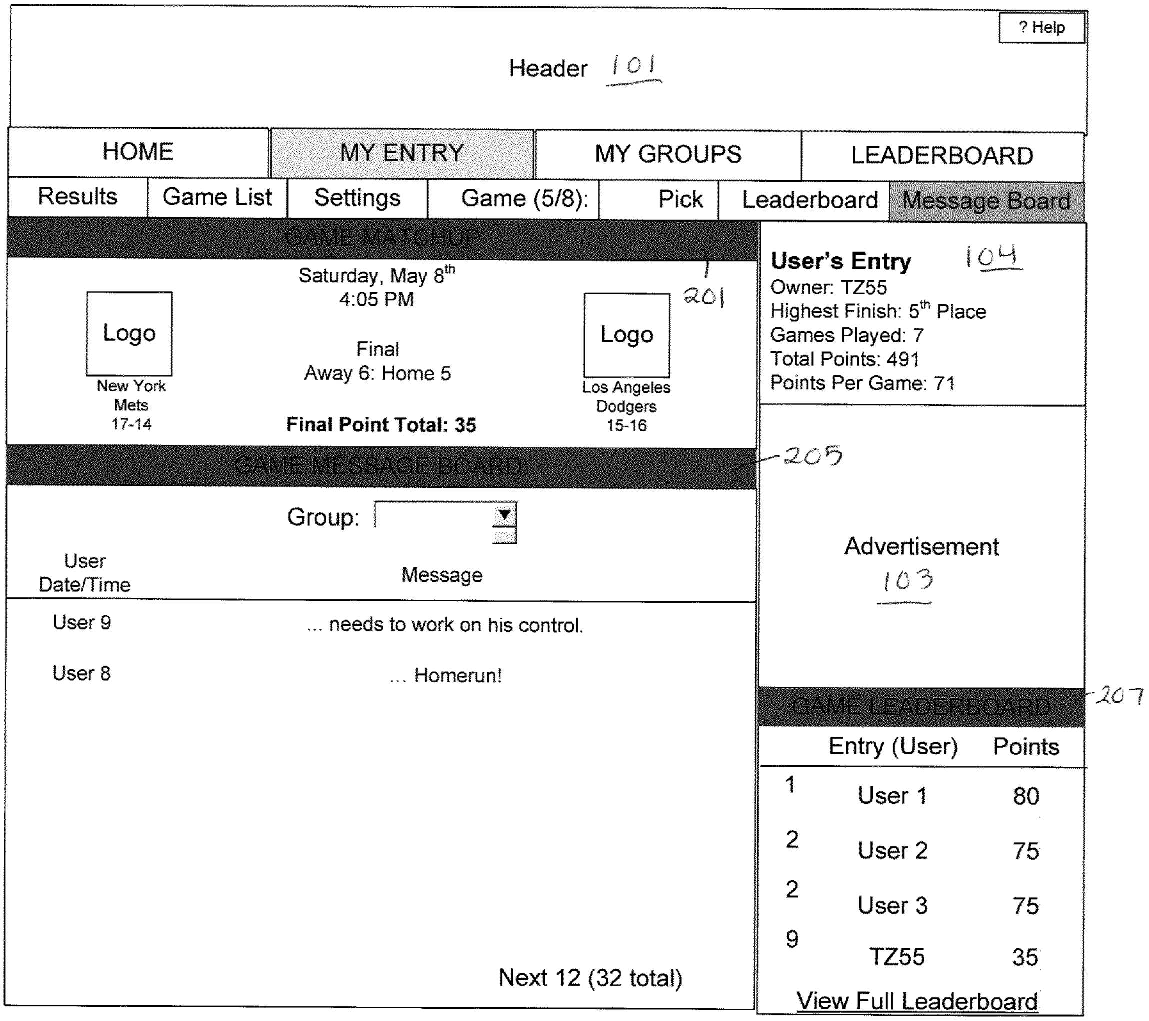
FIG. 16 illustrates an example interactive gaming interface, according to an example embodiment of the present invention.

Turning to FIG. 15, a “GAME MATCHUP” view of the interface 100 is illustrated when a broadcast event is occurring (e.g., during a game). As shown, a game leaderboard portion 203 displays an ordered list of all entries with user picks for a game. The list includes rank, entry name, user’s screen name, and points earned. In the list, if picks are locked (end of second or end of 7th) for the game, the row is a link to the Game Pick for the associated entry. If picks are not locked, the row is not a link but the entry name is a link to the entry home page for the user. As also shown, the community section 204 displays summary totals and rank for at least two participating “Fans of” official groups involved in the broadcast event (e.g., sports teams playing). As also shown, game message board 205 displays recent messages for the specific game shown. The message board 205 includes user’s screen name, date and time of message, and the message. The portion 205 may also include an icon to flag a message for review, may be set to auto-refresh continuously during a game until an end of a game, and may include a link to a full message board rendering of interface 100 (FIG. 16). As shown in FIG. 16, a game leaderboard portion 207 may be provided to display top entries for a specific game. The display may include rank, entry name, user’s screen name, and points earned for game thus far, and may include a link to view an entire game’s leaderboard.

Figure 17:
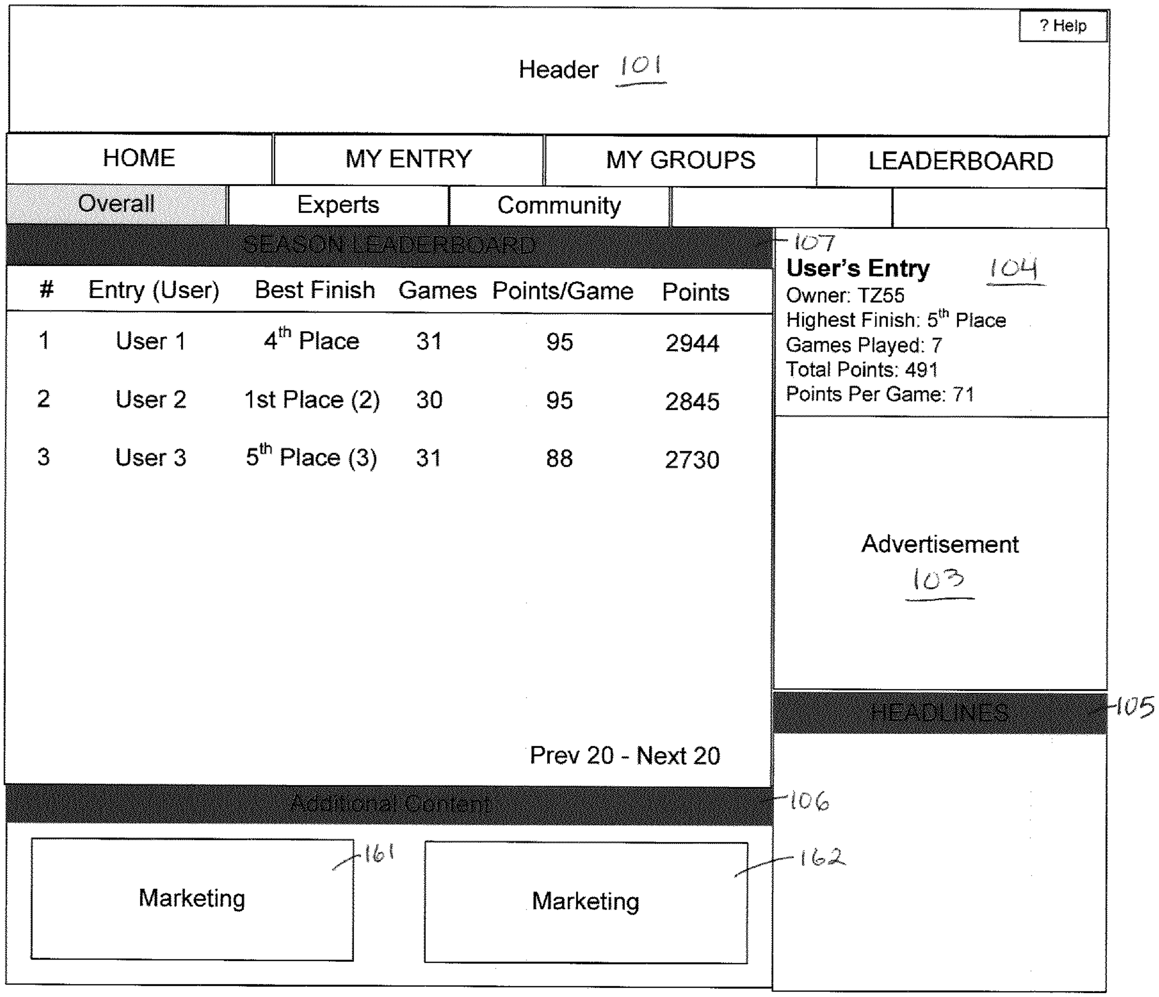
FIG. 17 illustrates an example interactive gaming interface, according to an example embodiment of the present invention.

Turning to FIG. 17, a “SEASON LEADERBOARD” view of interface 100 is provided, which includes portions to display results and rankings for an entire season of broadcast events.

As described above, through interaction with interface 100 during a broadcast event, a user may traverse any or all available interface portions, register for new events, view game statistics, view event information, and perform other interactions associated with the interactive online game and broadcast events.

Figure 18:
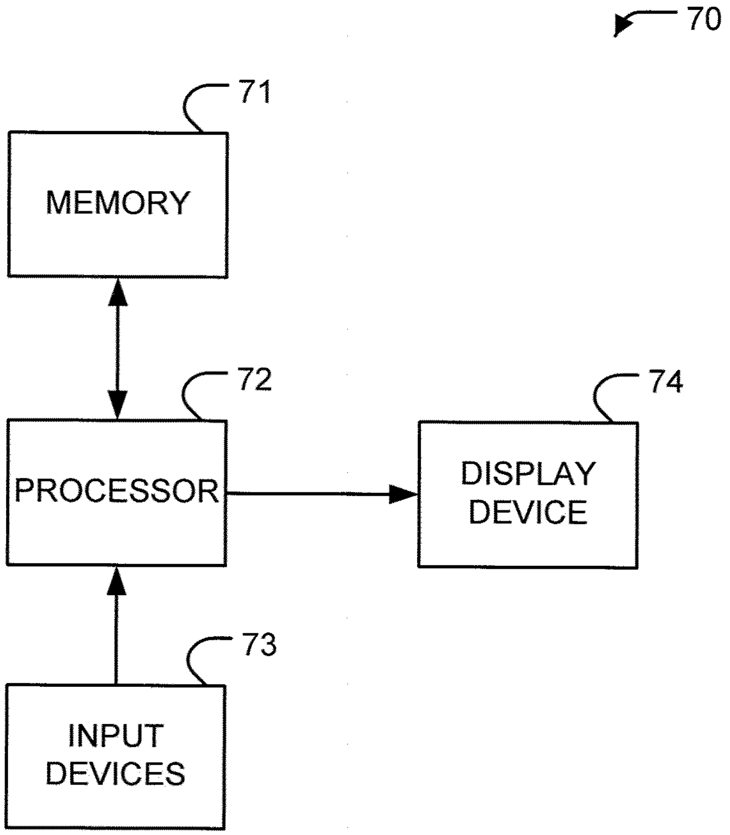
FIG. 18 illustrates an example computer/server apparatus, according to an example embodiment of the present invention.

The methodologies and systems of example embodiments of the present invention can be implemented in hardware, software, firmware, or a combination thereof. For example, FIG. 18 illustrates an example computing apparatus configured to perform the methods described herein. The apparatus 70 includes memory 71, processor 72, input devices 73, and display device 74. Embodiments may be implemented in software or firmware that is stored in memory 71 and that is executed by a suitable instruction execution system. These systems may include any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of at least one example embodiment of the present invention in which functions may be executed out of order from that shown or discussed, including substantially concurrently or in reverse order, depending on the functionality involved, as would be understood by those reasonably skilled in the art of the present invention.

Any program which would implement functions or acts noted in the figures, which comprise an ordered listing of executable instructions for implementing logical functions, can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium, upon which the program is printed, as the program can be electronically captured, via for instance optical scanning of the paper or other medium, then compiled, interpreted or otherwise processed in a suitable manner if necessary, and then stored in a computer memory. In addition, the scope of the present invention includes embodying the functionality of the preferred embodiments of the present invention in logic embodied in hardware or software-configured mediums.

It should be emphasized that the above-described embodiments of the present invention, particularly, any detailed discussion of particular examples, are merely possible examples of implementations, and are set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method of interactive gaming, comprising:
- identifying a broadcast event;
- prior to the broadcast event generating an initial set of interactive questions for the broadcast event based upon a subject of the broadcast event;
- organizing the generated questions based on a structure of the broadcast event; and
- providing the organized questions to a user before or during a broadcast of the broadcast event through an interactive gaming interface based on the structure of the broadcast event.

2. The method of claim 1, further comprising receiving a set of user credentials from the user, wherein identifying the broadcast event includes selecting the broadcast event from a pool of available events based upon the set of user credentials.

3. The method of claim 1, further comprising:
- receiving a set of user credentials;
- identifying a plurality of available broadcast events based on the set of user credentials; and
- providing a listing of the available broadcast events.

4. The method of claim 3, further comprising:
- receiving a selection of at least one broadcast event of the plurality of available broadcast events;
- generating the interactive questions for the selected broadcast event;
- organizing the generated questions based on the structure of the selected broadcast event; and
- providing the organized questions to the user during a broadcast of the selected broadcast event through the interactive gaming interface based on the structure of the selected broadcast event.

5. The method of claim 1, further comprising providing the organized questions to a plurality of users during the broadcast of the broadcast event through the interactive gaming interface.

6. The method of claim 5, further comprising receiving a set of answers for the organized question from each user of the plurality of users.

7. The method of claim 6, further comprising:
- tallying correct answers of the sets of answers for each user of the plurality of users;
- ranking each user based on the tally; and
- displaying ranking results of the ranking for the plurality of users through the interactive gaming interface.

8. The method of claim 1, wherein generating the interactive questions for the broadcast event includes generating a set of questions about the broadcast event based on at least one of the type of event and participants in the event.

9. The method of claim 1, wherein organizing the generated questions includes ordering the generated questions based on a level of difficulty.

10. The method of claim 1, wherein organizing the generated questions includes ordering the generated questions based on predetermined segments of the broadcast event.

11. A system for interactive gaming, comprising:
- a broadcast event server configured to provide a televised feed of broadcast events; and
- an interactive gaming web server in communication with the broadcast event server, wherein the interactive gaming server is configured to perform a method of interactive gaming, the method comprising:
- identifying a broadcast event available through the broadcast event server;
- prior to the broadcast event generating an initial set of interactive questions for the broadcast event based upon a subject of the broadcast event;
- organizing the generated questions based on a structure of the broadcast event; and
- providing the organized questions to a user before or during a broadcast of the broadcast event through an interactive gaming interface based on the structure of the broadcast event.

12. The system of claim 11, wherein the method further comprises receiving a set of user credentials from the user, wherein identifying the broadcast event includes selecting the broadcast event from a pool of available events based upon the set of user credentials.

13. The system of claim 11, wherein the method further comprises:
- receiving a set of user credentials;
- identifying a plurality of available broadcast events based on the set of user credentials; and
- providing a listing of the available broadcast events.

14. The system of claim 13, wherein the method further comprises:

receiving a selection of at least one broadcast event of the plurality of available broadcast events;

generating the interactive questions for the selected broadcast event;

organizing the generated questions based on the structure of the selected broadcast event; and providing the organized questions to the user during a broadcast of the selected broadcast event through the interactive gaming interface based on the structure of the selected broadcast event.

15. The system of claim 11, wherein the interactive gaming server is further configured to provide the organized questions to a plurality of users during the broadcast of the broadcast event through the interactive gaming interface.

16. The system of claim 15, wherein the method further comprises receiving a set of answers for the organized question from each user of the plurality of users.

17. The system of claim 16, wherein the method further comprises:

tallying correct answers of the sets of answers for each user of the plurality of users;

ranking each user based on the tally; and displaying ranking results for the plurality of users through the interactive gaming interface.

18. The system of claim 11, wherein generating the interactive questions for the broadcast event includes generating a set of questions about the broadcast event based on at least one of the type of event and participants in the event.

19. The system of claim 11, wherein organizing the generated questions includes ordering the generated questions based on a level of difficulty.

20. The system of claim 11, wherein organizing the generated questions includes ordering the generated questions based on predetermined segments of the broadcast event.

21. The method of claim 1, wherein said initial set of interactive questions are presented to a user and are available for answer only during a predetermined broadcast event window that excludes at least a later portion of the broadcast event.

22. The system of claim 11, wherein said initial set of interactive questions are presented to a user and are available for answer only during a predetermined broadcast event window that excludes at least a later portion of the broadcast event.

23. The method of claim 1, wherein said initial set of interactive questions are selected from a plurality of categories.

24. The system of claim 11, wherein said initial set of interactive questions are selected from a plurality of categories.

25. The method of claim 23, wherein said broadcast event is a sporting event, and wherein said plurality of categories include two or more of: best fantasy day; player specific props, team specific props and statistical facts.

26. The system of claim 24, wherein said broadcast event is a sporting event, and wherein said plurality of categories include two or more of: best fantasy day; player specific props, team specific props and statistical facts.

27. The method of claim 1, wherein said questions are presented to a user along with possible answers and an indication as to the respective popularity of said answers.

28. The system of claim 11, wherein said questions are presented to a user along with possible answers and an indication as to the respective popularity of said answers.

29. The method of claim 21, wherein at least one subsequent question is presented to a user during the broadcast event.

30. The system of claim 22, wherein at least one subsequent question is presented to a user during the broadcast event.

31. The method of claim 29, wherein said at least one subsequent question comprises a bonus question that is presented at a predetermined time subsequent to said predetermined broadcast event window.

32. The system of claim 30, wherein said at least one subsequent question comprises a bonus question that is presented at a predetermined time subsequent to said predetermined broadcast event window.

* * * * *